US008732496B2

(12) United States Patent
Wyatt

(10) Patent No.: US 8,732,496 B2
(45) Date of Patent: May 20, 2014

(54) METHOD AND APPARATUS TO SUPPORT A SELF-REFRESHING DISPLAY DEVICE COUPLED TO A GRAPHICS CONTROLLER

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 229 days.

(21) Appl. No.: 13/071,408

(22) Filed: Mar. 24, 2011

(65) Prior Publication Data

US 2012/0242671 A1 Sep. 27, 2012

(51) Int. Cl.
*G06F 1/26* (2006.01)

(52) U.S. Cl.
USPC .......... 713/320

(58) Field of Classification Search
USPC .......... 713/320
See application file for complete search history.

(56) References Cited

U.S. PATENT DOCUMENTS 7,627,723 B1 12/2009 Buck et al.
7,676,667 B2 3/2010 Kuo
2003/0099147 A1* 5/2003 Deng et al. .......... 365/230.05
2008/0079739 A1 4/2008 Gupta et al.
2008/0126736 A1* 5/2008 Heil .......... 711/171
2009/0259854 A1 10/2009 Cox
2010/0146127 A1* 6/2010 Schmieder et al. .......... 709/228
2010/0318725 A1* 12/2010 Kwon .......... 711/103
2011/0047316 A1* 2/2011 Farhan et al. .......... 711/103
2011/0143809 A1 6/2011 Salomone et al.
2012/0066443 A1* 3/2012 Li et al. .......... 711/103
2012/0249559 A1* 10/2012 Khodorkovsky et al. .......... 345/502

FOREIGN PATENT DOCUMENTS

EP 2515294 A2 10/2012

OTHER PUBLICATIONS

Extended European Search Report dated Sep. 30, 2013, Application No. EP12161320.2, 6 pages.
European Search Report dated Nov. 8, 2013, Application No. EP12 16 2538, 2 pages.

* cited by examiner

*Primary Examiner* — Paul Yanchus, III
*Assistant Examiner* — Alyaa T Mazyad
(74) *Attorney, Agent, or Firm* — Patterson & Sheridan, LLP

(57) ABSTRACT

A method and apparatus for supporting a self-refreshing display device coupled to a graphics controller are disclosed. A self-refreshing display device has a capability to drive the display based on video signals generated from a local frame buffer. A graphics controller coupled to the display device may optimally be placed in one or more power saving states when the display device is operating in a panel self-refresh mode. Data objects stored in a memory associated with the graphics controller may be aliased in another memory subsystem accessible to the operating system, graphical user interface, or applications executing in the system while the graphics controller is in a deep sleep state. The disclosed technique utilizes a virtual memory pointer, that may be updated in one or more virtual memory page tables to point to either the memory associated with the graphics controller or an alternate memory alias.

20 Claims, 11 Drawing Sheets

METHOD AND APPARATUS TO SUPPORT A SELF-REFRESHING DISPLAY DEVICE COUPLED TO A GRAPHICS CONTROLLER

BACKGROUND OF THE INVENTION

1. Field of the Invention

The invention relates generally to display systems and, more specifically, to a method and apparatus to support a self-refreshing display device coupled to a graphics controller.

2. Description of the Related Art

Computer systems typically include some sort of display device, such as a liquid crystal display (LCD) device, coupled to a graphics controller. During normal operation, the graphics controller generates video signals that are transmitted to the display device by scanning-out pixel data from a frame buffer based on timing information generated within the graphics controller. Some recently designed display devices have a self-refresh capability, where the display device includes a local controller configured to generate video signals from a static, cached frame of digital video independently from the graphics controller. When in such a self-refresh mode, the video signals are driven by the local controller, thereby allowing portions of the graphics controller to be turned off to reduce the overall power consumption of the computer system. Once in self-refresh mode, when the image to be displayed needs to be updated, control may be transitioned back to the graphics controller to allow new video signals to be generated based on a new set of pixel data.

One drawback to shutting down portions of the graphics controller is that the operating system or applications running on the host computer system may be configured to access data objects stored in a memory associated with the graphics controller. If the graphics controller is switched off, such as when the display device is operating in a self-refresh mode, the operating system or applications may lose access to the objects stored in the graphics memory. This may cause the operating system or applications to crash.

As the foregoing illustrates, what is needed in the art is an improved technique for providing access to data object stored in a memory associated with a graphics controller.

SUMMARY OF THE INVENTION

One embodiment of the present invention sets forth a method for controlling a graphics processing unit coupled to a self-refreshing display device. The method includes the steps of detecting a trigger event that indicates that the display device is set to enter a self-refresh mode and, in response to detecting the trigger event, determining whether any mutual exclusion mechanisms in a set of mutual exclusion mechanisms is bound to a data object stored in a memory associated with the graphics processing unit. The method also includes the steps of, if at least one mutual exclusion mechanism is bound to a data object, then delaying transition into a deep sleep state or, if no mutual exclusion mechanisms are bound to a data object, then entering the deep sleep state.

One advantage of the disclosed technique is that the physical storage locations of the data objects are transparent to an operating system or applications executing on the host computer system. A pointer that identifies the physical storage location is the same for the applications whether the data object resides in the graphics memory or the system memory. Furthermore, the state of the data object may be tracked while the graphics controller is switched off to determine whether the graphics controller needs to update the data object in the graphics memory once the graphics controller is woken up and resumes processing graphics data to generate video signals for display on the display device. Consequently, the transition into and out of a self-refresh mode is transparent to an operating system and application that are configured to access the data objects.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
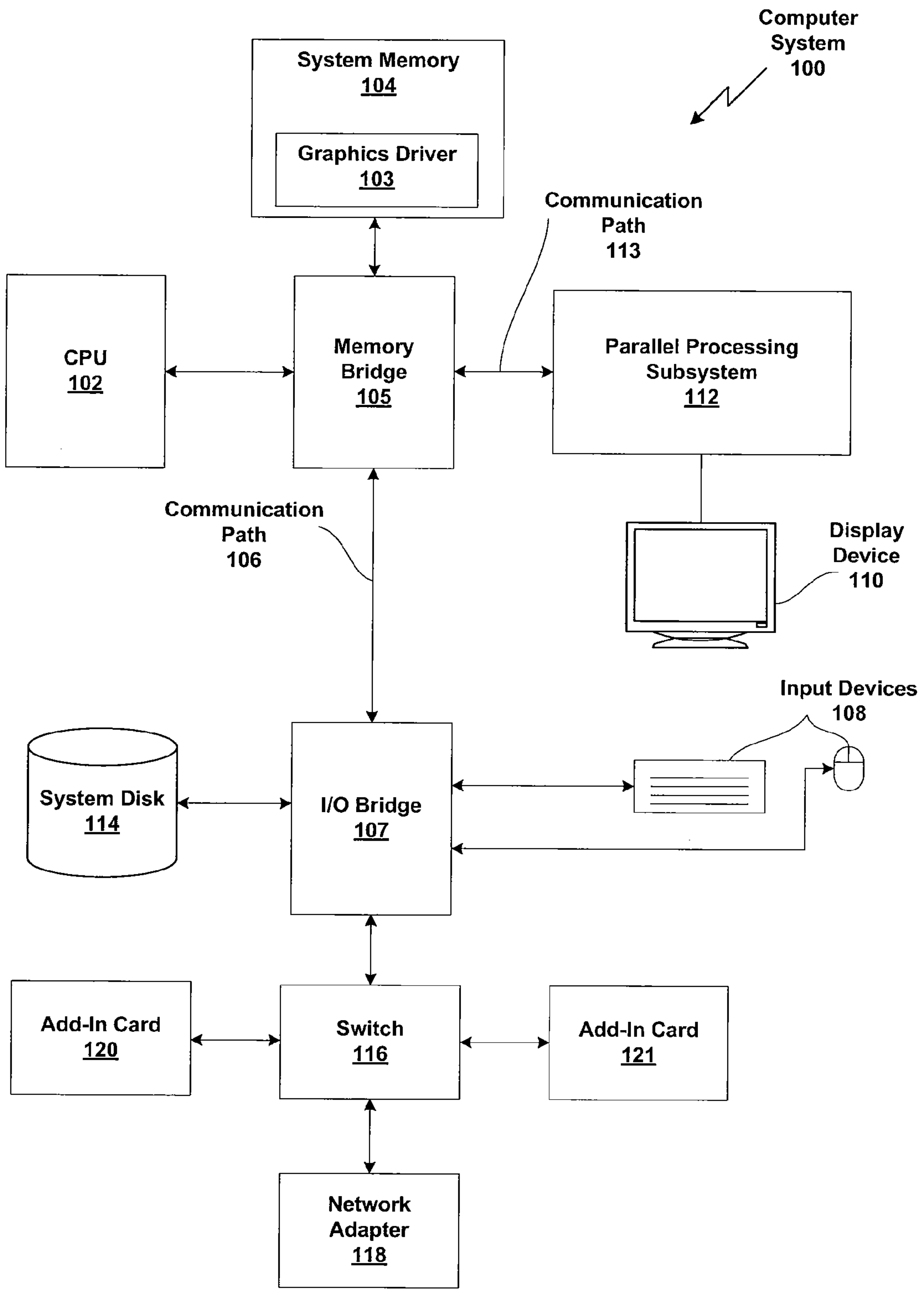
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
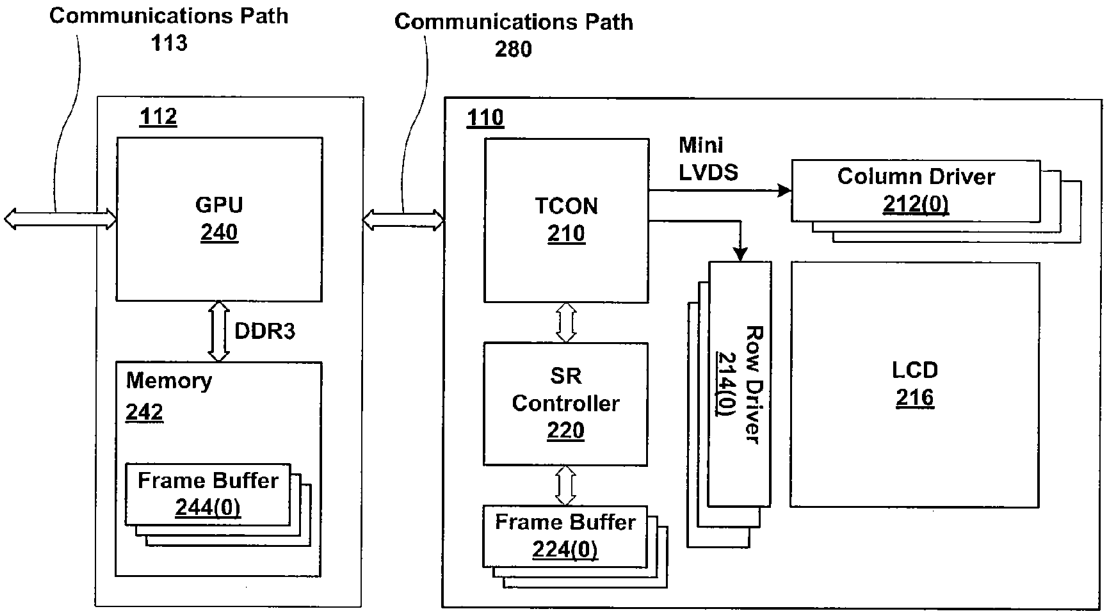
FIG. 2A illustrates a parallel processing subsystem coupled to a display device that includes a self-refreshing capability, according to one embodiment of the present invention.

FIG. 2A illustrates a parallel processing subsystem 112 coupled to a display device 110 that includes a self-refreshing capability, according to one embodiment of the present invention. As shown, parallel processing subsystem 112 includes a graphics processing unit (GPU) 240 coupled to a graphics memory 242 via a DDR3 bus interface. Graphics memory 242 includes one or more frame buffers 244(0), 244(1) . . . 244(N−1), where N is the total number of frame buffers implemented in parallel processing subsystem 112. Parallel processing subsystem 112 is configured to generate video signals based on pixel data stored in frame buffers 244 and transmit the video signals to display device 110 via communications path 280. Communications path 280 may be any video interface known in the art, such as an embedded Display Port (eDP) interface or a low voltage differential signal (LVDS) interface.

GPU 240 may be configured to receive graphics primitives from CPU 102 via communications path 113, such as a PCIe bus. GPU 240 processes the graphics primitives to produce a frame of pixel data for display on display device 110 and stores the frame of pixel data in frame buffers 244. In normal operation, GPU 240 is configured to scan out pixel data from frame buffers 244 to generate video signals for display on display device 110. In one embodiment, GPU 240 is configured to generate a digital video signal and transmit the digital video signal to display device 110 via a digital video interface such as an LVDS, DVI, HDMI, or DisplayPort (DP) interface. In another embodiment, GPU 240 may be configured to generate an analog video signal and transmit the analog video signal to display device 110 via an analog video interface such as a VGA or DVI-A interface. In embodiments where communications path 280 implements an analog video interface, display device 110 may convert the received analog video signal into a digital video signal by sampling the analog video signal with one or more analog to digital converters.

As also shown in FIG. 2A, display device 110 includes a timing controller (TCON) 210, self-refresh controller (SRC) 220, a liquid crystal display (LCD) device 216, one or more column drivers 212, one or more row drivers 214, and one or more local frame buffers 224(0), 224(1) . . . 224(M−1), where M is the total number of local frame buffers implemented in display device 110. TCON 210 generates video timing signals for driving LCD device 216 via the column drivers 212 and row drivers 214. Column drivers 212, row drivers 214 and LCD device 216 may be any conventional column drivers, row drivers, and LCD device known in the art. As also shown, TCON 210 may transmit pixel data to column drivers 212 and row drivers 214 via a communication interface, such as a mini LVDS interface.

SRC 220 is configured to generate video signals for display on LCD device 216 based on pixel data stored in local frame buffers 224. In normal operation, display device 110 drives LCD device 216 based on the video signals received from parallel processing subsystem 112 over communications path 280. In contrast, when display device 110 is operating in a panel self-refresh mode, display device 110 drives LCD device 216 based on the video signals received from SRC 220.

GPU 240 may be configured to manage the transition of display device 110 into and out of a panel self-refresh mode. Ideally, the overall power consumption of computer system 100 may be reduced by operating display device 110 in a panel self-refresh mode during periods of graphical inactivity in the image displayed by display device 110. In one embodiment, to cause display device 110 to enter a panel self-refresh mode, GPU 240 may transmit a message to display device 110 using an in-band signaling method, such as by embedding a message in the digital video signals transmitted over communications path 280. In alternative embodiments, GPU 240 may transmit the message using a side-band signaling method, such as by transmitting the message using an auxiliary communications channel. Various signaling methods for signaling display device 110 to enter or exit a panel self-refresh mode are described below in conjunction with FIGS. 2B-2D.

Returning now to FIG. 2A, after receiving the message to enter the self-refresh mode, display device 110 caches the next frame of pixel data received over communications path 280 in local frame buffers 224. Display device 110 transitions control for driving LCD device 216 from the video signals generated by GPU 240 to video signals generated by SRC 220 based on the pixel data stored in local frame buffers 224. While the display device 110 is in the panel self-refresh mode, SRC 220 continuously generates repeating video signals representing the cached pixel data stored in local frame buffers 224 for one or more consecutive video frames.

In order to cause display device 110 to exit the panel self-refresh mode, GPU 240 may transmit a similar message to display device 110 using a similar method as that described above in connection with causing display device 110 to enter the panel self-refresh mode. After receiving the message to exit the panel self-refresh mode, display device 110 may be configured to ensure that the pixel locations associated with the video signals generated by GPU 240 are aligned with the pixel locations associated with the video signals generated by SRC 220 currently being used to drive LCD device 216 in the panel self-refresh mode. Once the pixel locations are aligned, display device may transition control for driving LCD device 216 from the video signals generated by SRC 220 to the video signals generated by GPU 240.

The amount of storage required to implement a self-refresh capability may be dependent on the size of the uncompressed frame of video used to continuously refresh the image on the display device 110. In one embodiment, display device 110 includes a single local frame buffer 224(0) that is sized to accommodate an uncompressed frame of pixel data for display on LCD device 216. The size of frame buffer 224(0) may be based on the minimum number of bytes required to store an uncompressed frame of pixel data for display on. LCD device 216, calculated as the result of multiplying the width by the height by the color depth of the native resolution of LCD device 216. For example, frame buffer 224(0) could be sized for an LCD device 216 configured with a WUXGA resolution (1920×1200 pixels) and a color depth of 24 bits per pixel (bpp). In this case, the amount of storage in local frame buffer 224(0) available for self-refresh pixel data caching should be at least 6750 kB of addressable memory (1920*1200*24 bpp; where 1 kilobyte is equal to 1024 or $2^{10}$ bytes).

In another embodiment, local frame buffer 224(0) may be of a size that is less than the number of bytes required to store an uncompressed frame of pixel data for display on LCD device 216. In such a case, the uncompressed frame of pixel data may be compressed by SRC 220, such as by run length encoding the uncompressed pixel data, and stored in frame buffer 224(0) as compressed pixel data. In such embodiments, SRC 220 may be configured to decode the compressed pixel data before generating the video signals used to drive LCD device 216. In yet other embodiments, GPU 240 may compress the frame of pixel data prior to encoding the compressed pixel data in the digital video signals transmitted to display device 110. For example, GPU 240 may be configured to encode the pixel data using an MPEG-2 format. In such embodiments, SRC 220 may store the compressed pixel data in local frame buffer 224(0) in the compressed format and decode the compressed pixel data before generating the video signals used to drive LCD device 216.

Display device 110 may be capable of displaying 3D video data, such as stereoscopic video data. Stereoscopic video data includes a left view and a right view of uncompressed pixel data for each frame of 3D video. Each view corresponds to a different camera position of the same scene captured approximately simultaneously. Some display devices are capable of displaying three or more views simultaneously, such as in some types of auto-stereoscopic displays.

In one embodiment, display device 110 may include a self-refresh capability in connection with stereoscopic video data. Each frame of stereoscopic video data includes two uncompressed frames of pixel data for display on LCD device 216. Each of the uncompressed frames of pixel data may be comprised of pixel data at the full resolution and color depth of LCD device 216. In such embodiments, local frame buffer 224(0) may be sized to hold one frame of stereoscopic video data. For example, to store uncompressed stereoscopic video data at WUXGA resolution and 24 bpp color depth, the size of local frame buffer 224(0) should be at least 13500 kB of addressable memory (2*1920*1200*24 bpp). Alternatively, local frame buffers 224 may include two frame buffers 224(0) and 224(1), each sized to store a single view of uncompressed pixel data for display on LCD device 216.

In yet other embodiments, SRC 220 may be configured to compress the stereoscopic video data and store the compressed stereoscopic video data in local frame buffers 224. For example, SRC 220 may compress the stereoscopic video data using Multiview Video Coding (MVC) as specified in the H.264/MPEG-4 AVC video compression standard. Alternatively, GPU 240 may compress the stereoscopic video data prior to encoding the compressed video data in the digital video signals for transmission to display device 110.

In one embodiment, display device 110 may include a dithering capability. Dithering allows display device 110 to display more perceived colors than the hardware of LCD device 216 is capable of displaying. Temporal dithering alternates the color of a pixel rapidly between two approximate colors in the available color palette of LCD device 216 such that the pixel is perceived as a different color not included in the available color palette of LCD device 216. For example, by alternating a pixel rapidly between white and black, a viewer may perceive the color gray. In a normal operating state, GPU 240 may be configured to alternate pixel data in successive frames of video such that the perceived colors in the image displayed by display device 110 are outside of the available color palette of LCD device 216. In a self-refresh mode, display device 110 may be configured to cache two successive frames of pixel data in local frame buffers 224. Then, SRC 220 may be configured to scan out the two frames of pixel data from local frame buffers 224 in an alternating fashion to generate the video signals for display on LCD device 216.

Figure 2B:
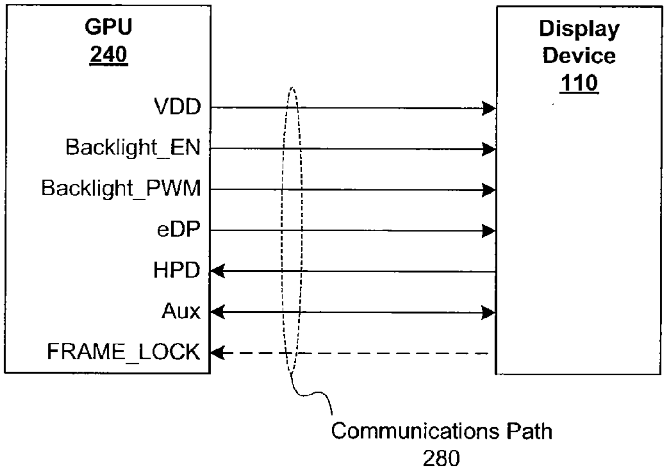
FIG. 2B illustrates a communications path that implements an embedded DisplayPort interface, according to one embodiment of the present invention.

FIG. 2B illustrates a communications path 280 that implements an embedded DisplayPort interface, according to one embodiment of the present invention. Embedded DisplayPort (eDP) is a standard digital video interface for internal display devices, such as an internal LCD device in a laptop computer. Communications path 280 includes a main link (eDP) that includes 1, 2 or 4 differential pairs (lanes) for high bandwidth data transmission. The eDP interface also includes a panel enable signal (VDD), a backlight enable signal (Backlight_EN), a backlight pwm signal (Backlight_PWM), and a hot-plug detect signal (HPD) as well as a single differential pair auxiliary channel (Aux). The main link is a unidirectional communication channel from GPU 240 to display device 110. In one embodiment, GPU 240 may be configured to transmit video signals generated from pixel data stored in frame buffers 244 over a single lane of the eDP main link. In alternative embodiments, GPU 240 may be configured to transmit the video signals over 2 or 4 lanes of the eDP main link.

The panel enable signal VDD may be connected from GPU to the display device 110 to turn on power in display device 110. The backlight enable and backlight pwm signals control the intensity of the backlight in display device 110 during normal operation. However, when the display device 110 is operating in a panel self-refresh mode, control for these signals must be handled by TCON 210 and may be changed by SRC 220 via control signals received over the auxiliary communication channel (Aux). One of skill in the art will recognize that the intensity of the backlight may be controlled by pulse width modulating a signal via the backlight pwm signal (Backlight_PWM). In some embodiments, communications path 280 may also include a frame lock signal (FRAME_LOCK) that indicates a vertical sync in the video signals generated by SRC 220. The FRAME_LOCK signal may be used to resynchronize the video signals generated by GPU 240 with the video signals generated by SRC 220.

The hot-plug detect signal, HPD, may be a signal connected from the display device 110 to GPU 240 for detecting a hot-plug event or for communicating an interrupt request from display device 110 to GPU 240. To indicate a hot-plug event, display device drives HPD high to indicate that a display device has been connected to communications path 280. After display device is connected to communications path 280, display device 110 may signal an interrupt request by quickly pulsing the HPD signal low for between 0.5 and 1 millisecond.

The auxiliary channel, Aux, is a low bandwidth, bidirectional half-duplex data communication channel used for transmitting command and control signals from GPU 240 to display device 110 as well as from display device 110 to GPU 240. In one embodiment, messages indicating that display device 110 should enter or exit a panel self-refresh mode may be communicated over the auxiliary channel. On the auxiliary channel, GPU 240 is a master device and display device 110 is a slave device. In such a configuration, data or messages may be sent from display device 110 to GPU 240 using the following technique. First, display device 110 indicates to GPU 240 that display device 110 would like to send traffic over the auxiliary channel by initiating an interrupt request over the hot-plug detect signal, HPD. When GPU 240 detects an interrupt request, GPU 240 sends a transaction request message to display device 110. Once display device 110 receives the transaction request message, display device 110 then responds with an acknowledgement message. Once GPU 240 receives the acknowledgement message, GPU 240 may read one or more register values in display device 110 to retrieve the data or messages over the auxiliary channel.

It will be appreciated by those of skill in the art that communications path 280 may implement a different video interface for transmitting video signals between GPU 240 and display device 110. For example, communications path 280 may implement a high definition multimedia interface (HDMI) or a low voltage differential signal (LVDS) video interface such as open-LDI. The scope of the invention is not limited to an Embedded DisplayPort video interface.

Figure 2C:
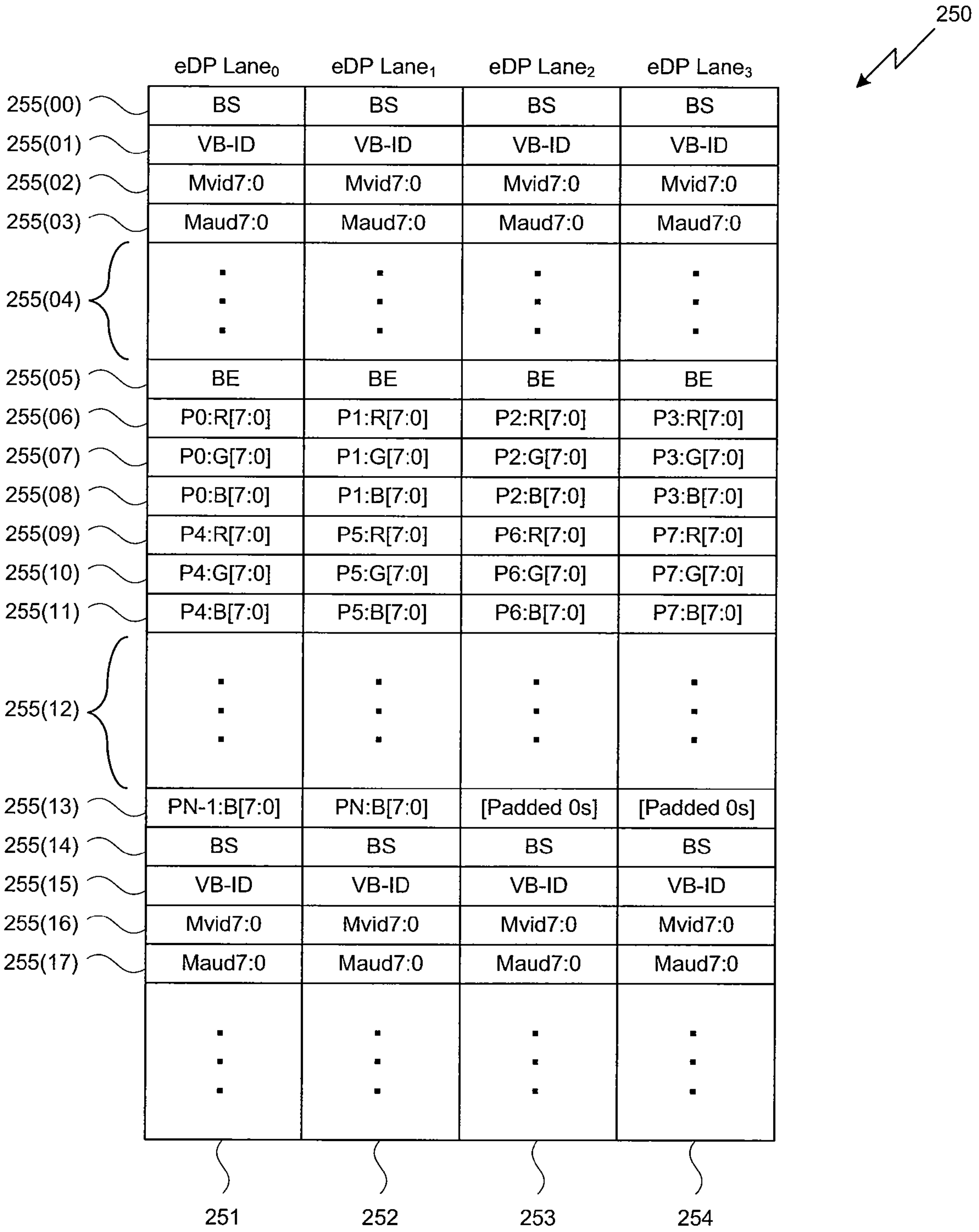
FIG. 2C is a conceptual diagram of digital video signals generated by a GPU for transmission over communications path, according to one embodiment of the present invention.

FIG. 2C is a conceptual diagram of digital video signals 250 generated by a GPU 240 for transmission over communications path 280, according to one embodiment of the present invention. As shown, digital video signals 250 is formatted for transmission over four lanes (251, 252, 253 and 254) of the main link of an eDP video interface. The main link of the eDP video interface may operate at one of three link symbol clock rates, as specified by the eDP specification (162 MHz, 270 MHz or 540 MHz). In one embodiment, GPU 240 sets the link symbol clock rate based on a link training operation that is performed to configure the main link when a display device 110 is connected to communications path 280. For each link symbol clock cycle 255, a 10-bit symbol, which encodes one byte of data or control information using 8b/10b encoding, is transmitted on each active lane of the eDP interface.

The format of digital video signals 250 enables secondary data packets to be inserted directly into the digital video signals 250 transmitted to display device 110. In one embodiment, the secondary data packets may include messages sent from GPU 240 to display device 110 that request display device 110 to enter or exit a panel self-refresh mode. Such secondary data packets enable one or more aspects of the invention to be realized over the existing physical layer of the eDP interface. It will be appreciated that this form of in-line signaling may be implemented in other packet based video interfaces and is not limited to embodiments implementing an eDP interface.

Secondary data packets may be inserted into digital video signals 250 during the vertical or horizontal blanking periods of the video frame represented by digital video signals 250. As shown in FIG. 2C, digital video signals 250 are packed one horizontal line of pixel data at a time. For each horizontal line of pixel data, the digital video signals 250 include a blanking start (BS) framing symbol during a first link clock cycle 255(00) and a corresponding blanking end (BE) framing symbol during a subsequent link clock cycle 255(05). The portion of digital video signals 250 between the BS symbol at link symbol clock cycle 255(00) and the BE symbol at link symbol clock cycle 255(5) corresponds to the horizontal blanking period.

Control symbols and secondary data packets may be inserted into digital video signals 250 during the horizontal blanking period. For example, a VB-ID symbol is inserted in the first link symbol clock cycle 255(01) after the BS symbol. The VB-ID symbol provides display device 110 with information such as whether the main video stream is in the vertical blanking period or the vertical display period, whether the main video stream is interlaced or progressive scan, and whether the main video stream is in the even field or odd field for interlaced video. Immediately following the VB-ID symbol, a video time stamp (Mvid7:0) and an audio time stamp (Maud7:0) are inserted at link symbol clock cycles 255(02) and 255(03), respectively. Dummy symbols may be inserted during the remainder of the link symbol clock cycles 255(04) during the horizontal blanking period. Dummy symbols may be a special reserved symbol indicating that the data in that lane during that link symbol clock cycle is dummy data. Link symbol clock cycles 255(04) may have a duration of a number of link symbol clock cycles such that the frame rate of digital video signals 250 over communications path 280 is equal to the refresh rate of display device 110.

A secondary data packet may be inserted into digital video signals 250 by replacing a plurality of dummy symbols during link symbol clock cycles 255(04) with the secondary data packet. A secondary data packet is framed by the special secondary start (SS) and secondary end (SE) framing symbols. Secondary data packets may include an audio data packet, link configuration information, or a message requesting display device 110 to enter or exit a panel self-refresh mode.

The BE framing symbol is inserted in digital video signals 250 to indicate the start of active pixel data for a horizontal line of the current video frame. As shown, pixel data P0 . . . PN has a RGB format with a per channel bit depth (bpc) of 8-bits. Pixel data P0 associated with the first pixel of the horizontal line of video is packed into the first lane 251 at link symbol clock cycles 255(06) through 255(08) immediately following the BE symbol. A first portion of pixel data P0 associated with the red color channel is inserted into the first lane 251 at link symbol clock cycle 255(06), a second portion of pixel data P0 associated with the green color channel is inserted into the first lane 251 at link symbol clock cycle 255(07), and a third portion of pixel data P0 associated with the blue color channel is inserted into the first lane 251 at link symbol clock cycle 255(08). Pixel data P1 associated with the second pixel of the horizontal line of video is packed into the second lane 252 at link symbol clock cycles 255(06) through 255(08), pixel data P2 associated with the third pixel of the horizontal line of video is packed into the third lane 253 at link symbol clock cycles 255(06) through 255(08), and pixel data P3 associated with the fourth pixel of the horizontal line of video is packed into the fourth lane 254 at link symbol clock cycles 255(06) through 255(08). Subsequent pixel data of the horizontal line of video are inserted into the lanes 251-254 in a similar fashion to pixel data P0 through P3. In the last link symbol clock cycle to include valid pixel data, any unfilled lanes may be padded with zeros. As shown, the third lane 253 and the fourth lane 254 are padded with zeros at link symbol clock cycle 255(13).

The sequence of data described above repeats for each horizontal line of pixel data in the frame of video, starting with the top most horizontal line of pixel data. A frame of video may include a number of horizontal lines at the top of the frame that do not include active pixel data for display on display device 110. These horizontal lines comprise the vertical blanking period and may be indicated in digital video signals 250 by setting a bit in the VB-ID control symbol.

Figure 2D:
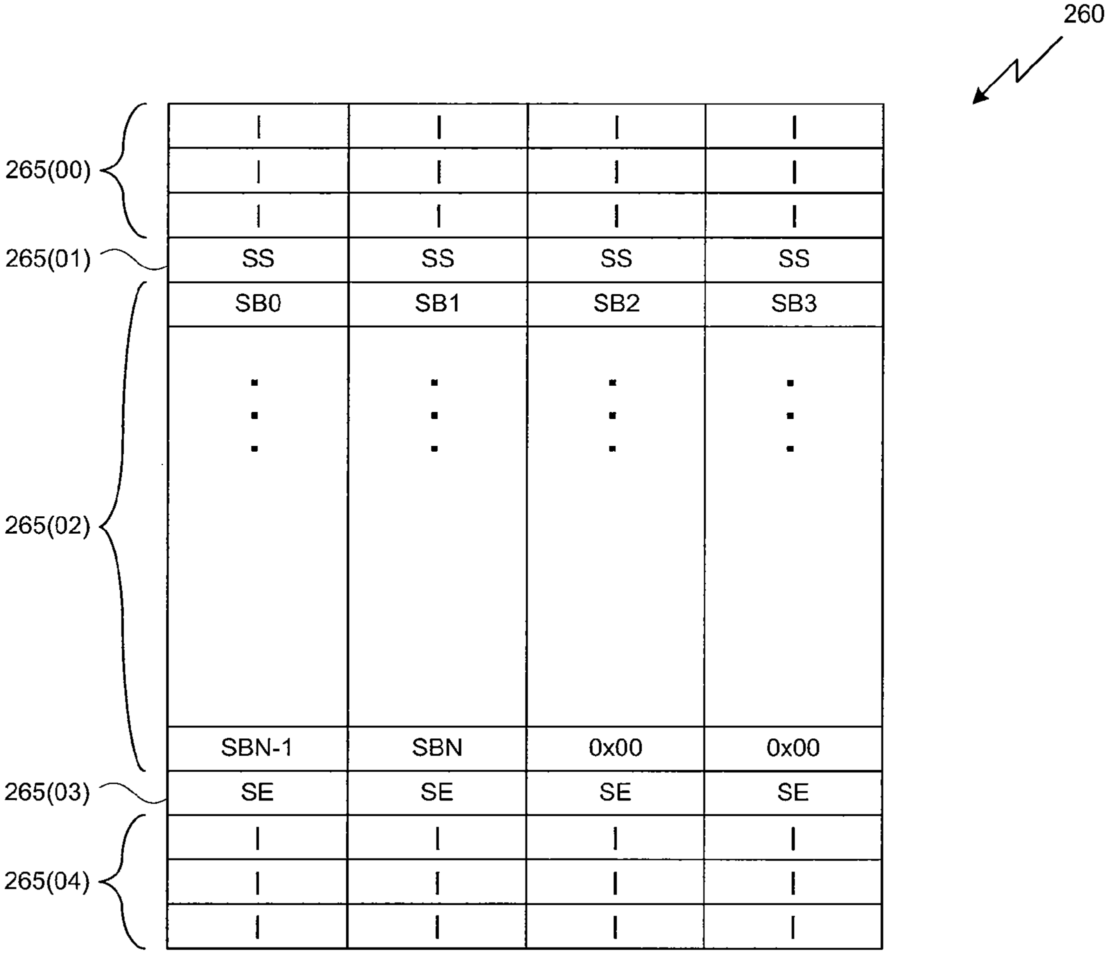
FIG. 2D is a conceptual diagram of a secondary data packet inserted in the horizontal blanking period of the digital video signals of FIG. 2C, according to one embodiment of the present invention.

FIG. 2D is a conceptual diagram of a secondary data packet 260 inserted in the horizontal blanking period of the digital video signals 250 of FIG. 2C, according to one embodiment of the present invention. A secondary data packet 260 may be inserted into digital video signals 250 by replacing a portion of the plurality of dummy symbols in digital video signals 250. For example, FIG. 2D shows a plurality of dummy symbols at link symbol clock cycles 265(00) and 265(04). GPU 240 may insert a secondary start (SS) framing symbol at link symbol clock cycle 265(01) to indicate the start of a secondary data packet 260. The data associated with the secondary data packet 260 is inserted at link symbol clock cycles 265(02). Each byte of the data (SB0 . . . SBN) associated with the secondary data packet 260 is inserted in one of the lanes 251-254 of digital video signals 250. Any slots not filled with data may be padded with zeros. GPU 240 then inserts a secondary end (SE) framing symbol at link symbol clock cycle 265(03).

In one embodiment, the secondary data packet 260 may include a header and data indicating that the display device 110 should enter or exit a self-refresh mode. For example, the secondary data packet 260 may include a reserved header code that indicates that the packet is a panel self-refresh packet. The secondary data packet may also include data that indicates whether display device 110 should enter or exit a panel self-refresh mode.

As described above, GPU 240 may send messages to display device 110 via an in-band signaling method, using the existing communications channel for transmitting digital video signals 250 to display device 110. In alternative embodiments, GPU 240 may send messages to display device 110 via a side-band method, such as by using the auxiliary communications channel in communications path 280. In yet other embodiments, a dedicated communications path, such as an additional cable, may be included to provide signaling to display device 110 to enter or exit the panel self-refresh mode.

Figure 3:
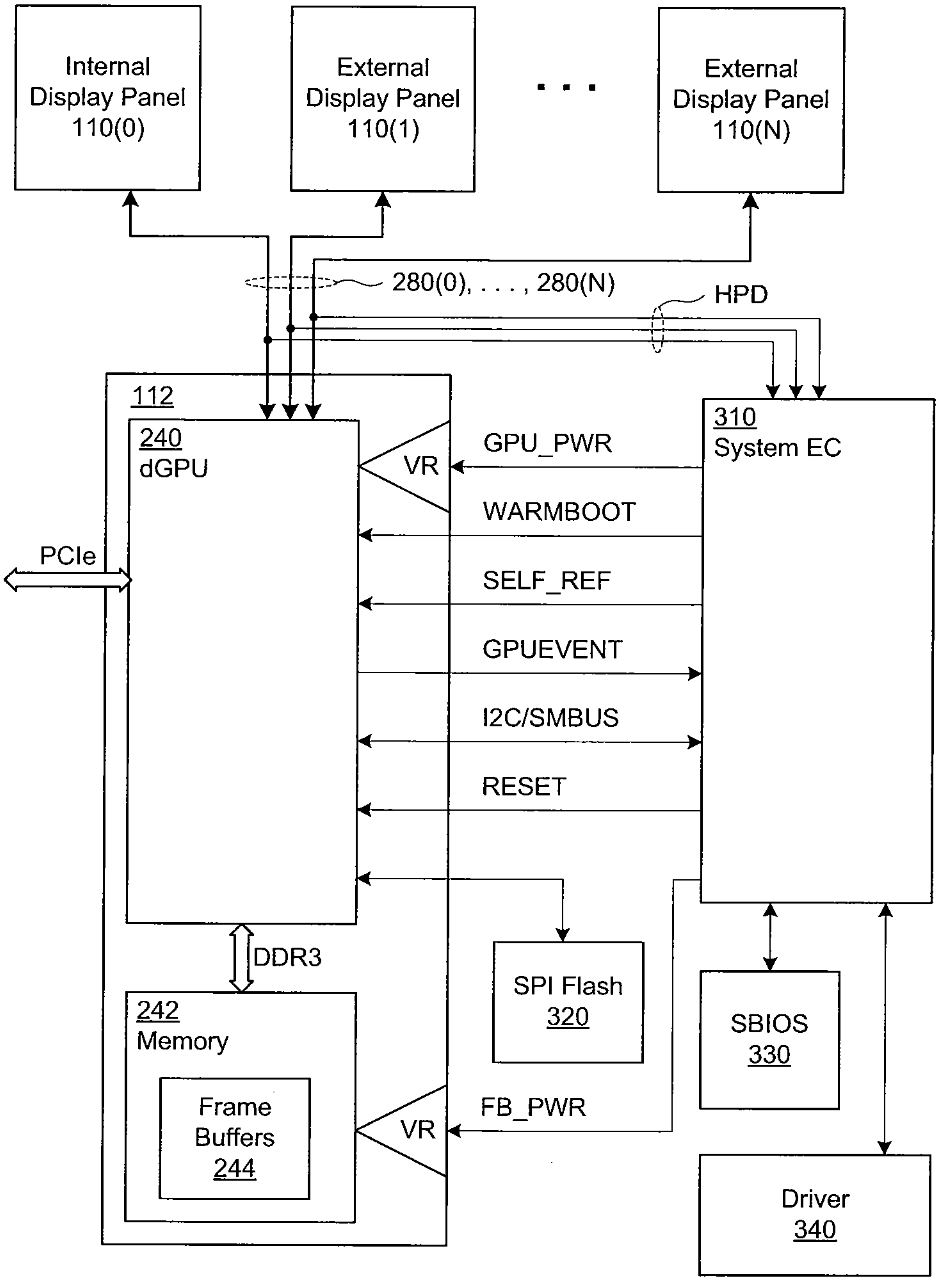
FIG. 3 illustrates communication signals between parallel processing subsystem and various components of computer system, according to one embodiment of the present invention.

FIG. 3 illustrates communication signals between parallel processing subsystem 112 and various components of computer system 100, according to one embodiment of the present invention. As shown, computer system 100 includes an embedded controller (EC) 310, an SPI flash device 320, a system basic input/output system (SBIOS) 330, and a driver 340. EC 310 may be an embedded controller that implements an advanced configuration and power interface (ACPI) that allows an operating system executing on CPU 102 to configure and control the power management of various components of computer system 100. In one embodiment, EC 310 allows the operating system executing on CPU 102 to communicate with GPU 240 via driver 340 even when the PCIe bus is down. For example, if GPU 240 and the PCIe bus are shut down in a power saving mode, the operating system executing on CPU 102 may instruct EC 310 to wake-up GPU 240 by sending a notify ACPI event to EC 310 via driver 340.

Computer system 100 may also include multiple display devices 110 such as an internal display panel 110(0) and one or more external display panels 110(1), , , 110(N). Each of the one or more display devices 110 may be connected to GPU 240 via communication paths 280(0) . . . 280(N). In one embodiment, each of the HPD signals included in communication paths 280 are also connected to EC 310. When one or more display devices 110 are operating in a panel self-refresh mode, EC 310 may be responsible for monitoring HPD and waking-up GPU 240 if EC 310 detects a hot-plug event or an interrupt request from one of the display devices 110.

In one embodiment, a FRAME_LOCK signal is included between internal display device 110(0) and GPU 240. FRAME_LOCK passes a synchronization signal from the display device 110(0) to GPU 240. For example, GPU 240 may synchronize video signals generated from pixel data in frame buffers 244 with the FRAME_LOCK signal. FRAME_LOCK may indicate the start of the active frame such as by passing the vertical sync signal used by TCON 210 to drive LCD device 216 to GPU 240.

EC 310 transmits the GPU_PWR and FB_PWR signals to voltage regulators that provide a supply voltage to the GPU 240 and frame buffers 244, respectively. EC 310 also transmits the WARMBOOT, SELF_REF and RESET signals to GPU 240 and receives a GPUEVENT signal from GPU 240. Finally, EC 310 may communicate with GPU 240 via an I2C or SMBus data bus. The functionality of these signals is described below.

The GPU_PWR signal controls the voltage regulator that provides GPU 240 with a supply voltage. When display device 110 enters a self-refresh mode, an operating system executing on CPU 102 may instruct EC 310 to kill power to GPU 240 by making a call to driver 340. Driver 340 will then drive the GPU_PWR signal low to kill power to GPU 240 to reduce the overall power consumption of computer system 100. Similarly, the FB_PWR signal controls the voltage regulator that provides frame buffers 244 with a supply voltage. When display device 110 enters the self-refresh mode, computer system 100 may also kill power to frame buffers 244 in order to further reduce overall power consumption of computer system 100. The FB_PWR signal is controlled in a similar manner to the GPU_PWR signal. The RESET signal may be asserted during wake-up of the GPU 240 to hold GPU 240 in a reset state while the voltage regulators that provide power to GPU 240 and frame buffers 244 are allowed to stabilize.

The WARMBOOT signal is asserted by EC 310 to indicate that GPU 240 should restore an operating state from SPI flash device 320 instead of performing a full, cold-boot sequence. In one embodiment, when display device 110 enters a panel self-refresh mode, GPU 240 may be configured to save a current state in SPI flash device 320 before GPU 240 is powered down. GPU 240 may then restore an operating state by loading the saved state information from SPI flash device 320 upon waking-up. Loading the saved state information reduces the time required to wake-up GPU 240 relative to performing a full, cold-boot sequence. Reducing the time required to wake-up GPU 240 is advantageous during high frequency entry and exit into a panel self-refresh mode.

The SELF_REF signal is asserted by EC 310 when display device 110 is operating in a panel self-refresh mode. The SELF_REF signal indicates to GPU 240 that display device 110 is currently operating in a panel self-refresh mode and that communications path 280 should be isolated to prevent transients from disrupting the data stored in local frame buffers 224. In one embodiment, GPU 240 may connect communications path 280 to ground through weak, pull-down resistors when the SELF_REF signal is asserted.

The GPUEVENT signal allows the GPU 240 to indicate to CPU 102 that an event has occurred, even when the PCIe bus is off. GPU 240 may assert the GPUEVENT to alert system EC 310 to configure the I2C/SMBUS to enable communication between the GPU 240 and the system EC 310. The I2C/SMBUS is a bidirectional communication bus configured as an I2C, SMBUS, or other bidirectional communication bus to enable GPU 240 and system EC 310 to communicate. In one embodiment, the PCIe bus may be shut down when display device 110 is operating in a panel self-refresh mode. The operating system may notify GPU 240 of events, such as cursor updates or a screen refresh, through system EC 310 even when the PCIe bus is shut down.

Figure 4:
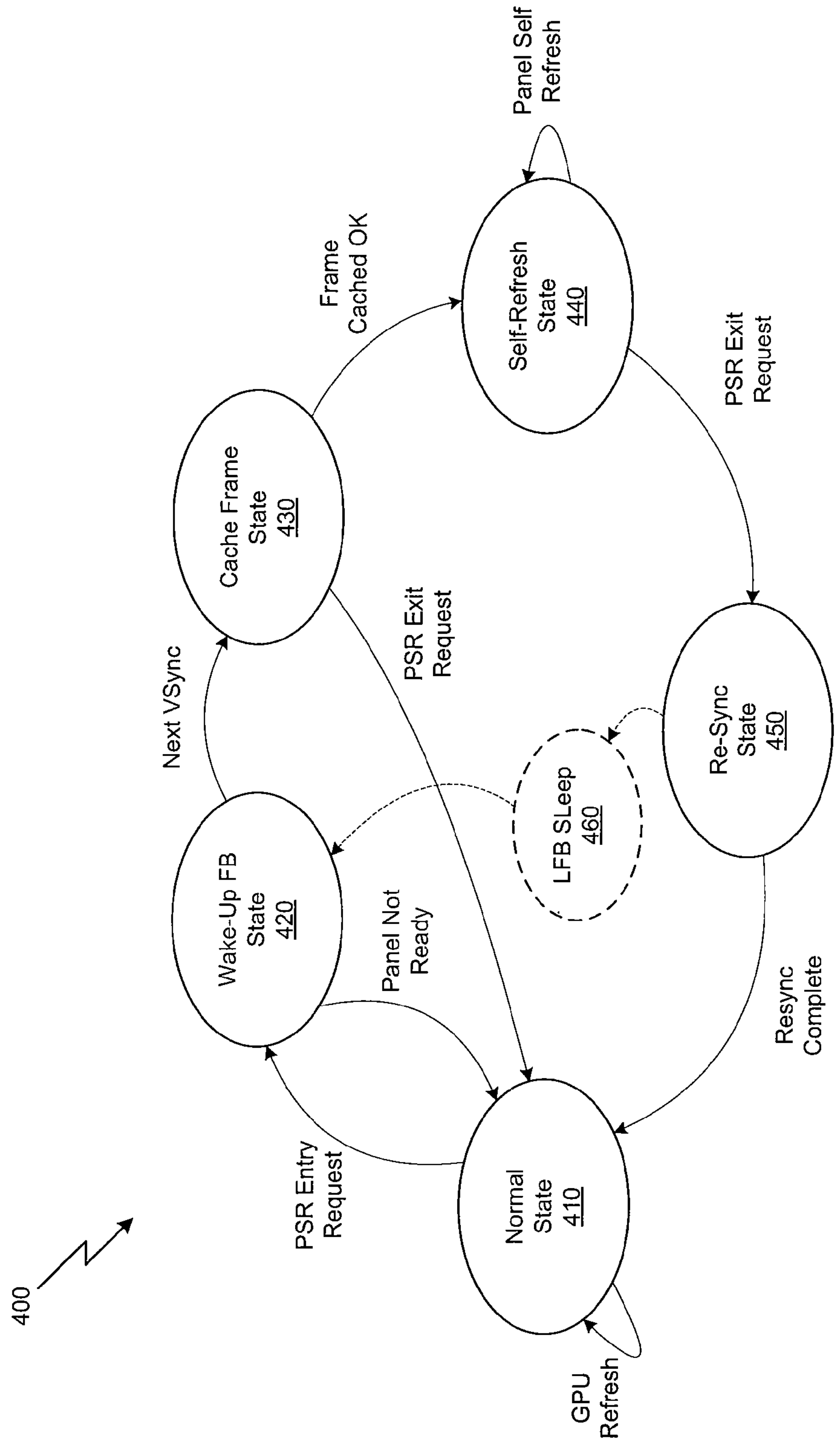
FIG. 4 is a state diagram for a display device having a self-refreshing capability, according to one embodiment of the present invention.

FIG. 4 is a state diagram 400 for a display device 110 having a self-refreshing capability, according to one embodiment of the present invention. As shown, display device 110 begins in a normal state 410. In the normal state 410, display device receives video signals from GPU 240. TCON 210 drives the LCD device 216 using the video signals received from GPU 240. In the normal operating state, display device 110 monitors communications path 280 to determine if GPU 240 has issued a panel self-refresh entry request. If display device 110 receives the panel self-refresh entry request, then display device 110 transitions to a wake-up frame buffer state 420.

In the wake-up frame buffer state 420, display device 110 wakes-up the local frame buffers 224. If display device 110 cannot initialize the local frame buffers 224, then display device 110 may send an interrupt request to GPU 240 indicating that the display device 110 has failed to enter the panel self-refresh mode and display device 110 returns to normal state 410. In one embodiment, display device 110 may be required to initialize the local frame buffers 224 before the next frame of video is received over communications path 280 (i.e., before the next rising edge of the VSync signal generated by GPU 240). Once display device 110 has completed initializing local frame buffers 224, display device 110 transitions to a cache frame state 430.

In the cache frame state 430, display device 110 waits for the next falling edge of the VSync signal generated by GPU 240 to begin caching one or more frames of video in local frame buffers 224. In one embodiment, GPU 240 may indicate how many consecutive frames of video to store in local frame buffers 224 by writing a value to a control register in display device 110. After display device has stored the one or more frames of video in local frame buffers 224, display device 110 transitions to a self-refresh state 440.

In the self-refresh state 440, the display device 110 enters a panel self-refresh mode where TCON 210 drives the LCD device 216 with video signals generated by SRC 220 based on pixel data stored in local frame buffers 224. Display device 110 stops driving the LCD device 216 based on the video signals generated by GPU 240. Consequently, GPU 240 and communications path 280 may be placed in a power saving mode to reduce the overall power consumption of computer system 100. While in the self-refresh state 440, display device 110 may monitor communications path 280 to detect a request from GPU 240 to exit the panel self-refresh mode. If display device 110 receives a panel self-refresh exit request, then display device 110 transitions to a re-sync state 450.

In the re-sync state 450, display device 110 attempts to re-synchronize the video signals generated by GPU 240 with the video signals generated by SRC 220. Various techniques for re-synchronizing the video signals are described below in conjunction with FIGS. 9A-9C and 10-13. When display device 110 has completed re-synchronizing the video signals, then display device 110 transitions back to a normal state 410. In one embodiment, display device 110 will cause the local frame buffers 224 to transition into a local frame buffer sleep state 460, where power supplied to the local frame buffers 224 is turned off.

In one embodiment, display device 110 may be configured to quickly exit wake-up frame buffer state 420 and cache frame state 430 if display device 110 receives an exit panel self-refresh exit request. In both of these states, display device 110 is still synchronized with the video signals generated by GPU 240. Thus, display device 110 may transition quickly back to normal state 410 without entering re-sync state 450. Once display device 110 is in self-refresh state 440, display device 110 is required to enter re-sync state 450 before returning to normal state 410.

Figure 5:
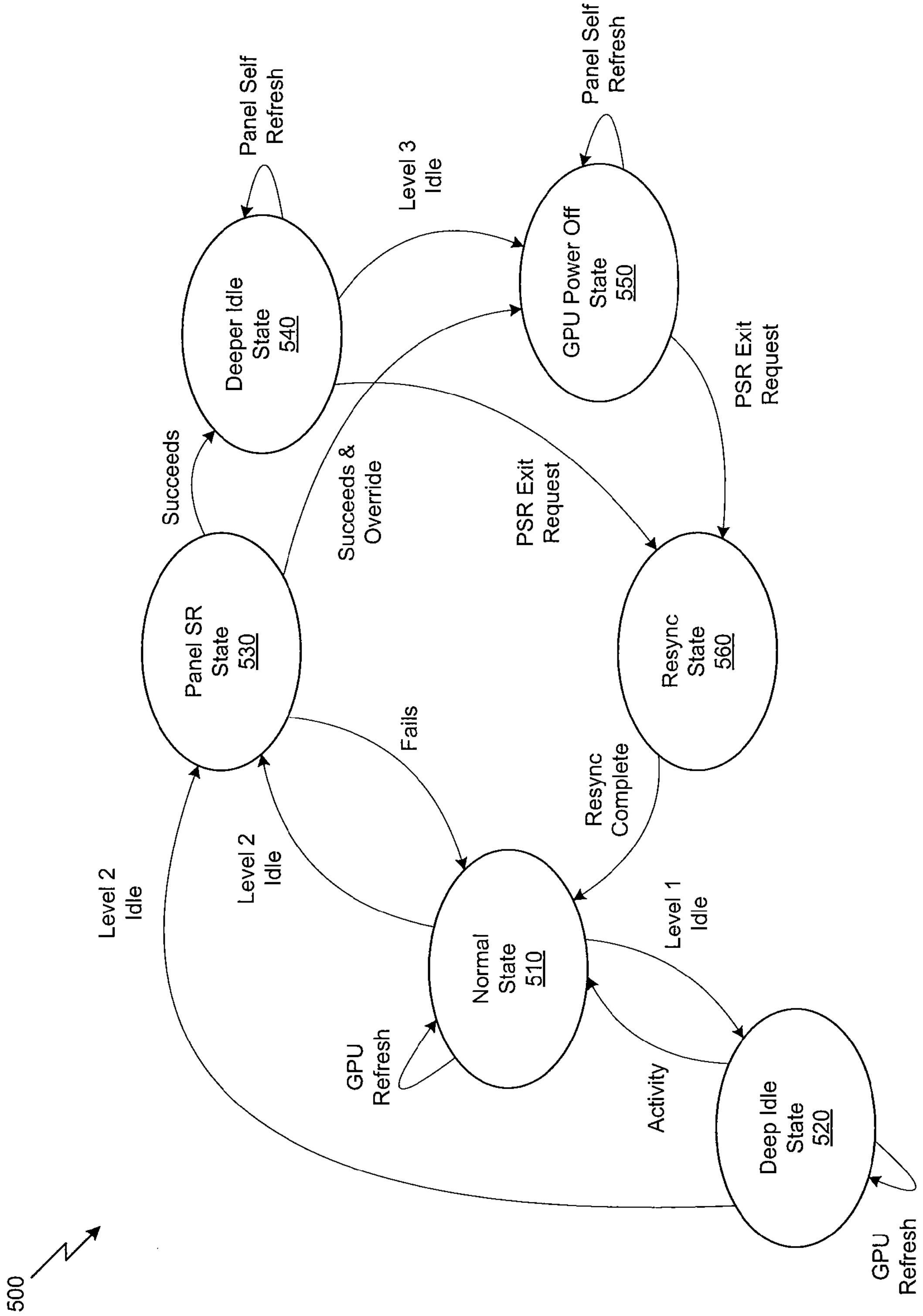
FIG. 5 is a state diagram for a GPU configured to control the transition of a display device into and out of a panel self-refresh mode, according to one embodiment of the present invention.

FIG. 5 is a state diagram 500 for a GPU 240 configured to control the transition of a display device 110 into and out of a panel self-refresh mode, according to one embodiment of the present invention. After initial configuration from a cold-boot sequence, GPU 240 enters a normal state 510. In the normal state, GPU 240 generates video signals for transmission to display device 110 based on pixel data stored in frame buffers 244. In one embodiment, GPU 240 monitors pixel data in frame buffers 244 to detect one or more progressive levels of idleness in the pixel data. For example, GPU 240 may compare the current frame of pixel data in frame buffers 244 with the previous frame of pixel data in frame buffers 244 to detect any graphical activity in the pixel data. Graphical activity may be detected if the pixel data is different between the two frames. In alternative embodiments, GPU 240 may detect progressive levels of idleness based on a factor other than the comparison of consecutive frames of pixel data in frame buffers 244. If GPU 240 fails to detect any graphical activity in the pixel data stored in frame buffers 244, then GPU 240 may increment a counter that indicates the number of consecutive frames of video without any graphical activity. If the counter reaches a first threshold value, then GPU 240 transitions to a deep-idle state 520.

In the deep-idle state 520, GPU 240 still generates video signals for display on display device 110. However, GPU 240 operates in a power saving mode, such as by clock-gating or power-gating certain processing portions of GPU 240 while keeping the portions of GPU 240 responsible for generating the video signals active. Additionally, GPU 240 may send a message to display device 110 requesting display device 110 to drive LCD device 216 at a lower refresh rate. For example, GPU 240 may request display device 110 to reduce the refresh rate from 75 Hz to 30 Hz, and GPU 240 may generate and transmit video signals based on the lower refresh rate. While operating in deep-idle state 520, GPU 240 may continue to monitor pixel data in frame buffers 244 for graphical activity. If GPU 240 detects graphical activity, GPU 240 transitions back to normal state 510. Returning to deep-idle state 520, GPU 240 may continue to increment the counter to determine the number of consecutive frames of video without any graphical activity. If the counter reaches a second threshold value, that is greater than the first threshold value, then GPU 240 transitions to a panel self-refresh state 530.

In some embodiments, the state diagram 500 does not include the deep-idle state 520. In such embodiments, GPU 240 may transition directly from the normal state 510 to the panel self-refresh state 530 when the counter reaches the second threshold value. In yet other embodiments, EC 310, graphics driver 103, or some other dedicated monitoring unit, may perform the monitoring of the pixel data in frame buffers 244 and send a message to GPU 240 over the I2C/SMBUS indicating that one of the progressive levels of idleness has been detected.

In the panel self-refresh state 530, GPU 240 transmits the one or more video frames for display during the panel self-refresh mode to display device 110. GPU 240 may monitor communications path 280 to detect a failure by display device 110 in entering self-refresh mode. In one embodiment, GPU 240 monitors the HPD signal to detect an interrupt request issued by display device 110. If GPU 240 detects an interrupt request from display device 110, then GPU 240 may configure the Auxiliary channel of communications path 280 to receive communications from display device 110. If display device 110 indicates that entry into self-refresh mode did not succeed, then GPU 240 may transition back to normal state 510. Otherwise, GPU 240 transitions to a deeper-idle state 540. In another embodiment, GPU 240 may override the transition into the deeper idle state 540 and transition directly into GPU power off state 550. In such embodiments, the GPU 240 will be completely shut down whenever display device 110 enters a panel self-refresh mode.

In the deeper-idle state 540, GPU 240 may be placed in a sleep state and the transmitter side of communications path 280 may be shut down. Portions of GPU 240 may be clock-gated or power-gated in order to reduce the overall power consumption of computer system 100. Display device 110 is responsible for refreshing the image displayed by display device 110. In one embodiment, GPU 240 may continue to monitor the pixel data in frame buffers 244 to detect a third level of idleness. For example, GPU 240 may continue to increment a counter for each frame of video where GPU 240 fails to update the pixel data in frame buffers 244. If GPU 240 detects graphical activity, such as by receiving a signal from EC 310 over the I2C/SMBUS or from graphics driver 103 over the PCIe bus, then GPU 240 transitions to the re-sync state 560. In contrast, if GPU 240 detects a third level of idleness in the pixel data, then GPU 240 transitions to a GPU power-off state 550.

In the GPU power-off state 550, EC 310 shuts down GPU 240 by turning off the voltage regulator supplying power to GPU 240. EC 310 may drive the GPU_PWR signal low to shut down the voltage regulator supplying GPU 240. In one embodiment, GPU 240 may save the current operating context in SPI flash device 320 in order to perform a warm-boot sequence on wake-up. In GPU power off state 550, a voltage regulator supplying power to graphics memory 242 may also be turned off. EC 310 may drive the FB_PWR signal low to shut down the voltage regulator supplying graphics memory 242.

When GPU 240 is in either the deeper-idle state 540 or the GPU power-off state 550, GPU 240 may be instructed to wake-up by EC 310 to update the image being displayed on display device 110. For example, a user of computer system 100 may begin typing into an application that requires GPU 240 to update the image displayed on the display device. In one embodiment, driver 340 may instruct EC 310 to assert the GPU_PWR and FB_PWR signals to turn on the voltage regulators supplying GPU 240 and frame buffers 244. When GPU 240 is turned on, GPU 240 will perform a boot sequence based on the status of the WARMBOOT signal and the RESET signal. If EC 310 asserts the WARM_BOOT signal, then GPU 240 may load a stored context from the SPI flash device 320. Otherwise GPU 240 may perform a cold-boot sequence. GPU 240 may also configure the transmitter side of communications path 280 based on information stored in SPI flash device 320. After GPU 240 has performed the boot sequence, GPU 240 may send a panel self-refresh exit request to display device 110. GPU 240 then transitions to a re-sync state 560.

In the re-sync state 560, GPU 240 begins generating video signals based on pixel data stored in frame buffers 244. The video signals are transmitted to display device 110 over communications path 280 and display device 110 attempts to re-synchronize the video signals generated by GPU 240 with the video signals generated by SRC 220. After re-synchronizing the video signals is complete, GPU 240 transitions back to the normal state 510.

Accessing Data Objects in Panel Self-Refresh Mode

Figure 6:
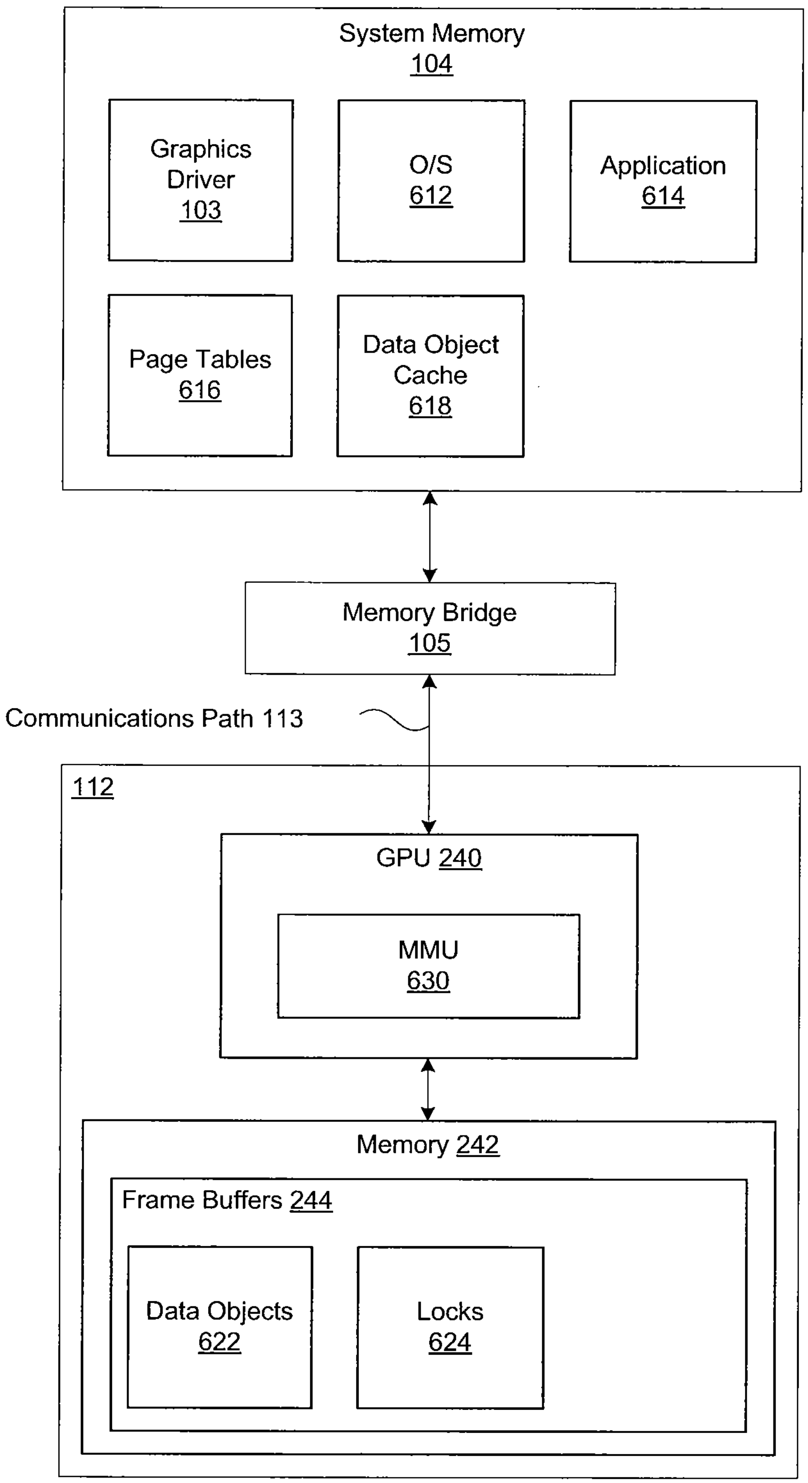
FIG. 6 illustrates a memory management algorithm implemented by computer system 100, according to one embodiment of the present invention.

FIG. 6 illustrates a memory management algorithm implemented by computer system 100, according to one embodiment of the present invention. As shown, system memory 104 includes graphics driver 103 (as described above in conjunction with FIG. 1) as well as an operating system 612, an application 614, locks 624, page tables 616, and a data object cache 618. Operating system 612 may be any operating system capable of implementing a virtualized memory architecture for computer system 100. For example, operating system 612 may be a Microsoft Windows™ operating system such as Windows™ XP. Application 614 may be a program (i.e., a set of instructions) configured to be executed by CPU 102. Application 614 may also include a shader program (i.e., one or more instructions that, when executed by GPU 240, cause GPU 240 to generate shaded pixel data). In one embodiment, application 614 may make calls to graphics driver 103 via an application programming interface (API), such as the Direct3D or OpenGL APIs, that cause graphics driver 103 to generate microcode for execution on GPU 240. In alternative embodiments, GPU 240 may be employed in a GPGPU environment, such as where GPU 240 is used to do highly parallel calculations on a large set of data. In such embodiments, the execution of the shader program instructions may cause GPU 240 to generate data that is not intended for display on display device 110. For example, the resulting data may be used in a finite element analysis of a 3D model to determine various failure modes of a designed structure.

As also shown, frame buffers 244 includes data objects 622, which may include one or more data objects (i.e., data structures) generated by GPU 240 during execution of a shader program. Application 614 may include one or more shader program instructions that cause GPU 240 to generate a data object in frame buffers 244. The data object may be stored in data objects 622. In one embodiment, operating system 612 or application 614 may be configured to access data objects 622 to read values from the resulting data as calculated by GPU 240 during execution of the shader program. It will be appreciated that more than one application executing on CPU 102 (or multiple threads of the same application) may request access to data objects 622 simultaneously. In one embodiment, computer system 100 may be configured to ensure that two applications or threads do not access a data object simultaneously.

In order to guarantee data coherency for data objects 622, operating system 612 may implement a mutual exclusion algorithm that prevents multiple applications or threads from accessing the same data object in data objects 622 simultaneously. In one embodiment, locks 624 includes one or more locks that are associated with a corresponding data object in data objects 622. A lock may be a single bit that is tested to determine if the data object is free, and the lock may be set by an application during the same instruction cycle in order for the application to access the data object. For example, when GPU 240 allocates memory in data objects 622 for a new data object, GPU 240 may also allocate a corresponding lock object (such as a bit) in locks 624 that is associated with the new data object. When an application 614 attempts to access a data object in data objects 622, GPU 240 may test the lock bit in locks 624 associated with the data object. If the associated lock bit is set, then the application 614 must wait until the owner application or thread releases the lock by clearing the lock bit. Once the lock has been released (i.e., the bit is cleared by the owner application or thread), then the application 614 can acquire the lock and access the associated data object in data objects 622. In alternative embodiments, other mutual exclusion algorithms may be implemented by operating system 612 to ensure mutual exclusive access to a data object. For example, possible mutual exclusion mechanisms may include access control locks, binary semaphores, atomic operations, or monitors (modules or methods that may be accessed by only a single thread at any point in time).

In one embodiment, locks 624 may also ensure that the data objects in data objects 622 are in a pre-defined format suitable for use by operating system 612 or application 614. In one embodiment, GPU 240 may temporarily store the data object in frame buffers 244 in a format that is efficient for processing by GPU 240. However, that format may be unsuitable for use by operating system 612 or application 614. For example, GPU 240 may store data objects in a compressed format to minimize latency in memory interface operations between GPU 240 and memory 242. However, CPU 102 may not be able to decode the compressed format. Therefore, when an application 614 attempts to acquire a lock on a particular data object, GPU 240 may cause the data object to be reformatted in the predefined format. In this manner, GPU 240 ensures that operating system 612 or application 614 receives a properly formatted data object.

In one embodiment, operating system 612 generates one or more page tables 616 in system memory 104. Page tables 616 allow the operating system 612 to map an address space in virtual memory to an address space in the physical memory such as an actual DRAM module coupled to CPU 102. Operating system 612 may generate a single page table for every process executing on CPU 102 or, alternatively, a separate page table associated with each currently executing process. CPU 102 may include a memory management unit (not shown) that includes a translation lookaside buffer (TLB) that caches recently used page table entries. When an application 614 or thread attempts to read a memory address in the virtual memory address space, the virtual address is transmitted to the memory management unit of CPU 102. If the virtual address matches a cached entry in the TLB, then the memory management unit returns an address in the physical memory associated with the virtual address. If the virtual address has no corresponding entry in the TLB, then CPU 102 walks through the page table entries in one or more page tables of page tables 616. If the virtual address matches a page table entry in page tables 616, then CPU 102 returns the corresponding address in physical memory listed in the page table entry. However, if the virtual address does not match a page table entry in page tables 616, then CPU 102 generates a page fault, that indicates that data associated with the virtual address is not currently loaded into system memory 104, and operating system 612 may load the data from a backing store such as system disk 114. The operating system 612 conventionally implements a page fault exception handler or software configured to execute whenever a page fault occurs.

In one embodiment, GPU 240 generates data objects in frame buffers 244 and transmits a handle to the new data object to graphics driver 103. Operating system 612 then generates a pointer to an address in the virtual memory address space that is associated with the data object. An entry is also created in a page table in page tables 616 that matches the address in the virtual memory address space to the physical address of the data object in memory 242. Thus, the pointer indirectly points to the data object in memory 242.

In order to access the data object, application 614 may acquire a lock associated with the data object. Once the associated lock is acquired, application 614 may attempt to read the data at the virtual address included in the pointer. The memory management unit in CPU 102 resolves the virtual address into a physical address as set forth above. The resolved physical address will point to the location in memory 242 associated with the data object. Recognizing that the address is located in memory 242, operating system 612 causes graphics driver 103 to transmit an instruction to GPU 240 via memory bridge 105 to read the values stored in the location indicated by the resolved address. GPU 240 receives the microcode instruction generated by graphics driver 103 and resolves the instruction in memory management unit (MMU) 630 included in GPU 240. MMU 630 transmits a control signal via the memory interface connecting GPU 240 to memory 242 to retrieve the requested data and then transmits the data to application 614 via graphics driver 103.

In other embodiments, the memory address space for memory 242 may also be virtualized. In such embodiments, GPU 240 may maintain one or more additional page tables (not shown) in memory 242 for implementing a virtual address space in a similar manner to that described above in connection with CPU 102 and system memory 104. Such a virtualized address space may be more efficient when more than one RAM unit is connected to GPU 240.

When display device 110 is operating in a panel self-refresh mode, GPU 240 and memory 242 may frequently be switched off. Thus, any attempts by operating system 612 or application 614 to access data objects 622 will fail. Ideally, GPU 240 will be prevented from entering a deep sleep state when one or more locks are presently acquired on data objects in data objects 622. In one embodiment, GPU 240 is configured to check locks 624 to determine whether there are any currently pending accesses to data objects 622. If any locks are set, then GPU 240 may delay entering the deep sleep state until no locks corresponding to data objects 622 are presently acquired. One of ordinary skill in the art would readily recognize that a currently acquired lock may indicate that operating system 612 or application 614 may attempt to read data from memory 242 sometime in the near future. Thus, GPU 240 should not enter a deep sleep state until all pending requests are complete.

In another embodiment, GPU 240 may be configured to cache one or more data objects from data objects 622 in system memory 104. For example, for each lock in locks 624 that is currently acquired by operating system 612 or application 614, GPU 240 may be configured to cause a copy of the corresponding data object in data objects 622 to be cached in system memory 104. Data object cache 618 includes one or more cached data objects that correspond to currently acquired locks in locks 624. GPU 240 may then cause page table entries corresponding to the pointers associated with the cached data objects to be updated to point to the cached versions of the data objects in data object cache 618. Consequently, when the memory management unit of CPU 102 resolves a virtual address for a cached data object, the resolved address will point to system memory 104 and not memory 242. Once all data objects have been cached and page table entries updated, GPU 240 may then cause display device 110 to enter the panel self-refresh state and GPU 240 may enter a deep sleep state such as GPU power off state 550.

In yet another embodiment, GPU 240 may be configured to cache data objects in system memory 104 even when a lock is not currently acquired on the data object. For example, GPU 240 may cache any data objects which have a high probability of being accessed by operating system 612 or application 614 while the GPU is in a deep sleep state. GPU 240 may be configured to always cache a primary surface that includes the visible pixel data being displayed on display device 110. On common function in the Windows operating system is the print-screen function that reads the pixel data contained in the primary surface and creates a digital copy of the image being displayed on display device 110 in system memory 104. By automatically caching the primary surface to system memory 104, operating system 612 may execute a call to the print-screen function without requiring the GPU 240 to exit the deep sleep state.

In still other embodiments, GPU 240 may be configured to track whether the cached versions of the data objects in data object cache 618 have been modified. When GPU 240 causes a data object to be cached in system memory 104, GPU 240 may also generate a hash value associated with an unmodified version of the cached data object and cause the hash value to be stored in system memory 104. Once GPU 240 exits the deep sleep state, GPU 240 may compare the stored hash value to a calculated hash value generated from the cached data object during the present time. If the stored hash value matches the calculated hash value, then GPU 240 may determine that the cached data object was not modified while GPU 240 was in the deep sleep state. If the cached data object was not modified, GPU 240 may not be required to write the cached version of the data object back to memory 242.

Instead of updating the page table entries to map the virtual address to an address of the cached versions of the data objects, the pointers to the data objects may be replaced with a null pointer object. The null pointer object includes an invalid memory address, that when attempted to be resolved by the memory management unit in CPU 102, causes a page fault exception to be thrown to operating system 612. A page fault exception handler may then be configured to handle the page fault. In one embodiment, the page fault exception handler may be configured to cause GPU 240 to wake-up so that GPU 240 can process the request by operating system 612 or application 614 to access the data object in memory 242. In another embodiment, the page fault exception handler may be responsible for remapping the page table entries to point to pre-cached versions of the data objects in system memory 104. Because the GPU 240 may remain in the deep sleep state for a short amount of time, such as 250 ms or less, it may be inefficient to perform all of the caching and remapping of page table entries only after display device 110 is ready to enter a self-refresh mode. Thus, GPU 240 may maintain cached versions of the data objects in system memory 104 during normal operation. Thus, GPU 240 may skip transmitting the data objects to graphics driver 103 after display device is ready to enter the panel self-refresh mode. Instead, the pointers for the data objects may be replaced in a much faster operation, and only when the operating system 612 or application 614 attempts to access the data object will the page table entry be updated by the page fault exception handler.

Figure 7A:
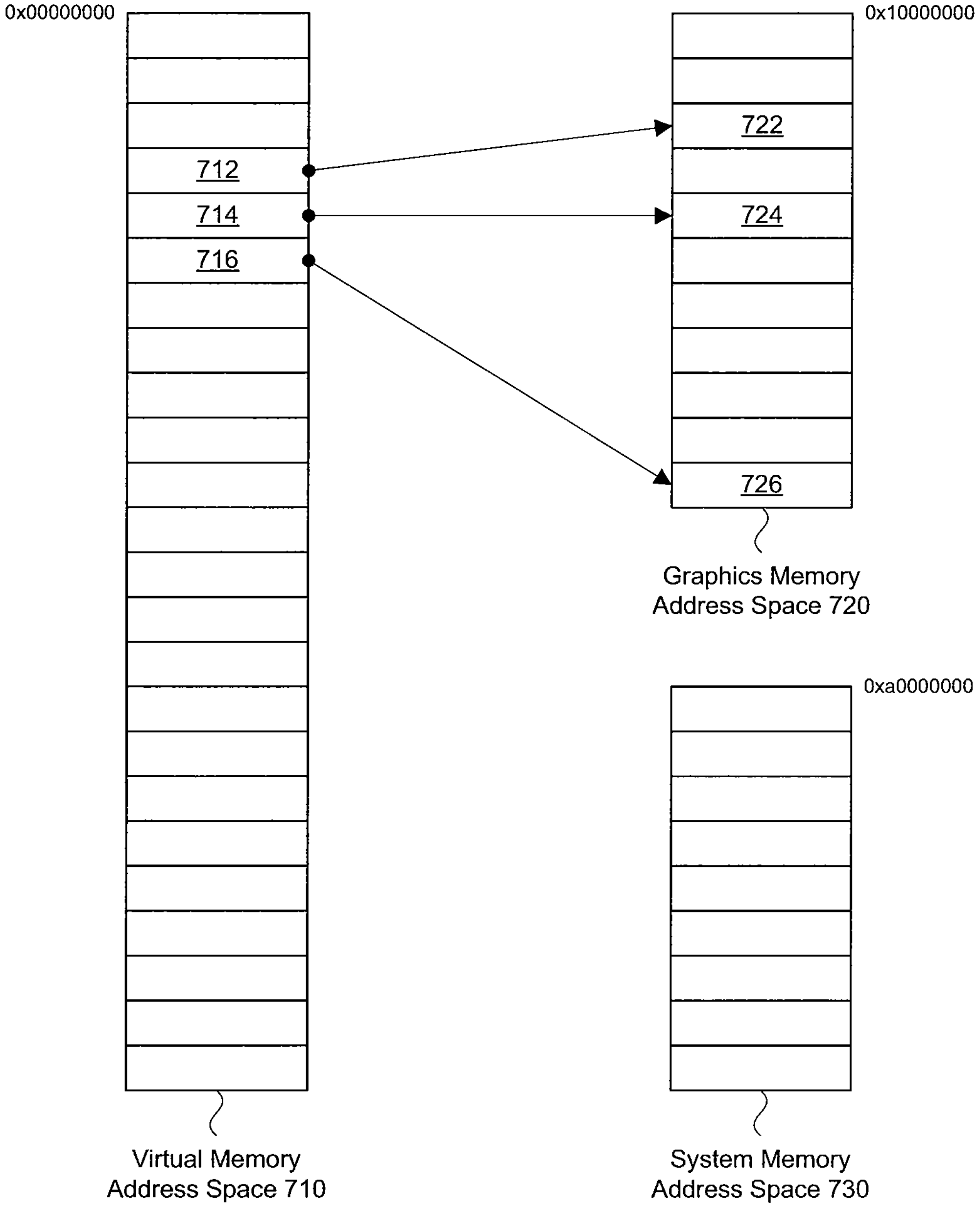
FIGS. 7A-7B are conceptual diagrams of a process for updating page table entries in a page table of computer system, according to one embodiment of the present invention.
Figure 7B:
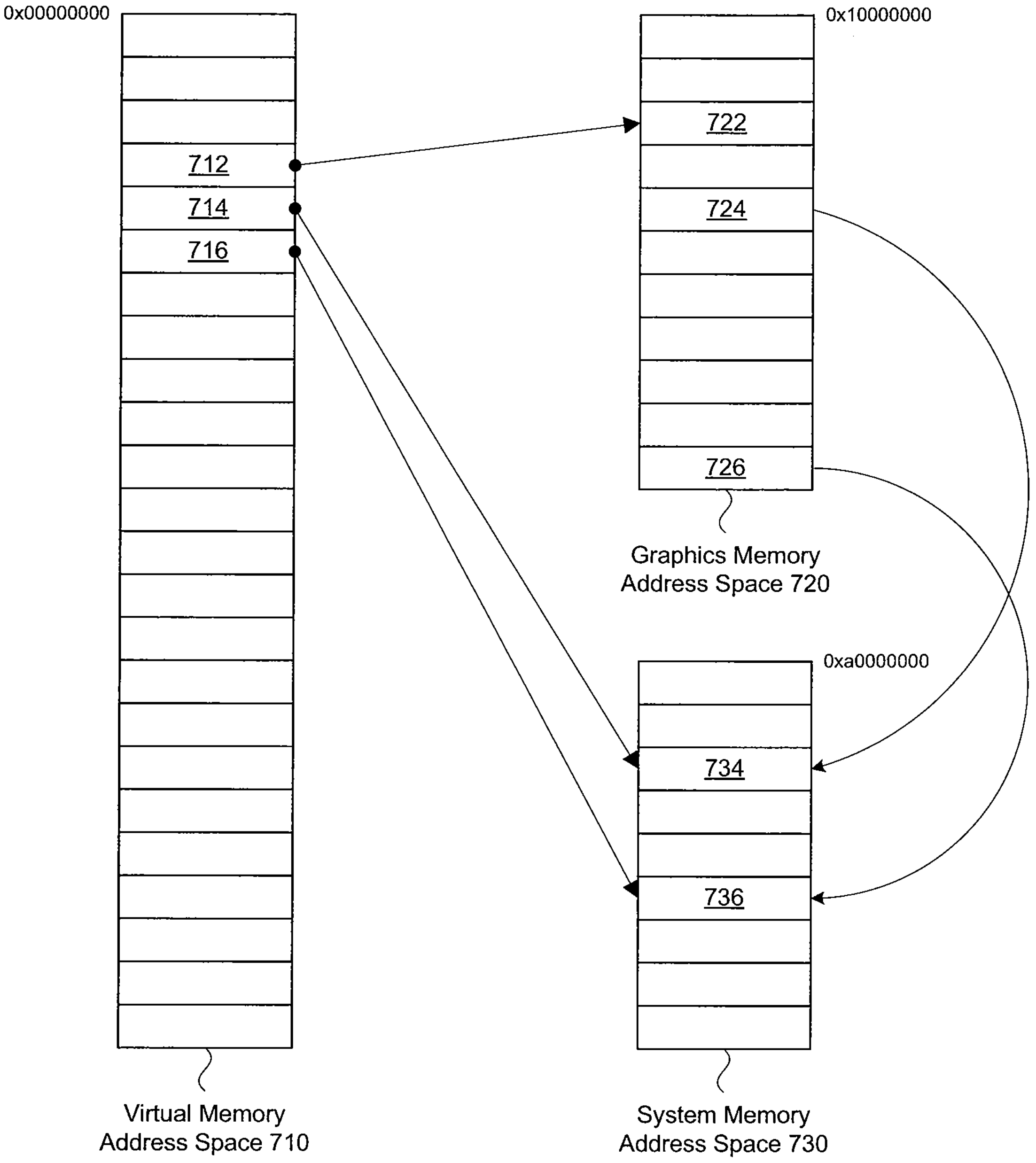

FIGS. 7A-7B are conceptual diagrams of a process for updating page table entries in a page table of computer system 100, according to one embodiment of the present invention. Operating system 612 may define a virtual memory address space 710 that obviates the need for application 614 to perform many memory management tasks. Operating system 612 may allocate a single virtual memory address space 710 for all applications executing on CPU 102, or operating system 612 may create a different virtual memory address space 710 for each application, such as application 614. Again, when GPU 240 allocates memory in frame buffers 244 for a data object, GPU 240 may also create a handle or a pointer (both of which may be referred to hereinafter as a pointer for simplicity) to the new data object. GPU may pass the pointer to graphics driver 103 so application 614 can access the values in the new data object. The pointer may include a memory address in the graphics memory address space 720 that points to the data object in the physical memory device. For example, GPU 240 may allocate memory for three data objects in graphics memory address space 720. A first data object is located at memory address 722, a second data object is located at memory address 724, and a third data object is located at memory address 726.

Upon receiving a pointer to a location in the graphics memory address space 720 at graphics driver 103, operating system 612 may update the pointer to point to an address in the virtual memory address space 710 instead of the graphics memory address space 720. Application 614 may access the data object using the virtual memory address space 710 by reading or writing to the address included in the updated pointer. As shown, operating system 612 updates the pointers to the three data objects to point to memory addresses 712, 714, and 716, respectively, in the virtual memory address space 710. While updating the pointers, operating system 612 also creates page table entries in page tables 616 to map memory address 712 in the virtual memory address space 710 to memory address 722 in the graphics memory address space 720, memory address 714 in the virtual memory address space 710 to memory address 724 in the graphics memory address space 720, and virtual memory address 716 in the virtual memory address space 710 to memory address 726 in the graphics memory address space 720.

Upon detecting a trigger event, such as detecting a first level of idleness in pixel data stored in frame buffers 244, GPU 240 may cause display device 110 to enter a panel self-refresh mode and transition into a deep sleep state. In one embodiment, GPU 240 determines whether operating system 612 or application 614 has acquired a lock on any data object in data objects 622. As shown in FIG. 7B, application 614 may have acquired a lock on the second data object located at memory address 724 and the third data object located at memory address 726. Consequently, before entering the deep sleep state, GPU 240 is configured to cause the second and third data objects in data object cache 618 to be cached in system memory 104. GPU 240 transmits the second and third data objects to graphics driver 103, which requests operating system 612 to allocate memory in system memory address space 730 for the data objects. Operating system 612 may allocate a block of memory starting at memory address 734 to store the second data object and a block of memory starting at memory address 736 to store the third data object. GPU 240 then transmits a request to graphics driver 103 to update the page table entries in page tables 616 such that memory address 714 in the virtual memory address space 710 corresponds to memory address 734 in the system memory address space 730, and virtual memory address 716 in the virtual memory address space 710 corresponds to memory address 736 in the system memory address space 730. Application 614 continues to reference the second and third data objects using memory address 714 and 716, respectively. However, when the memory management unit of CPU 102 resolves the virtual address into a physical address, the resolved address points to the cached version of the data objects in system memory 104. Thus, even though the location of the cached data object is different from the location of the data object, application 614 uses the exact same pointer as originally provided to application 614 when the data object was created by GPU 240.

Figure 8:
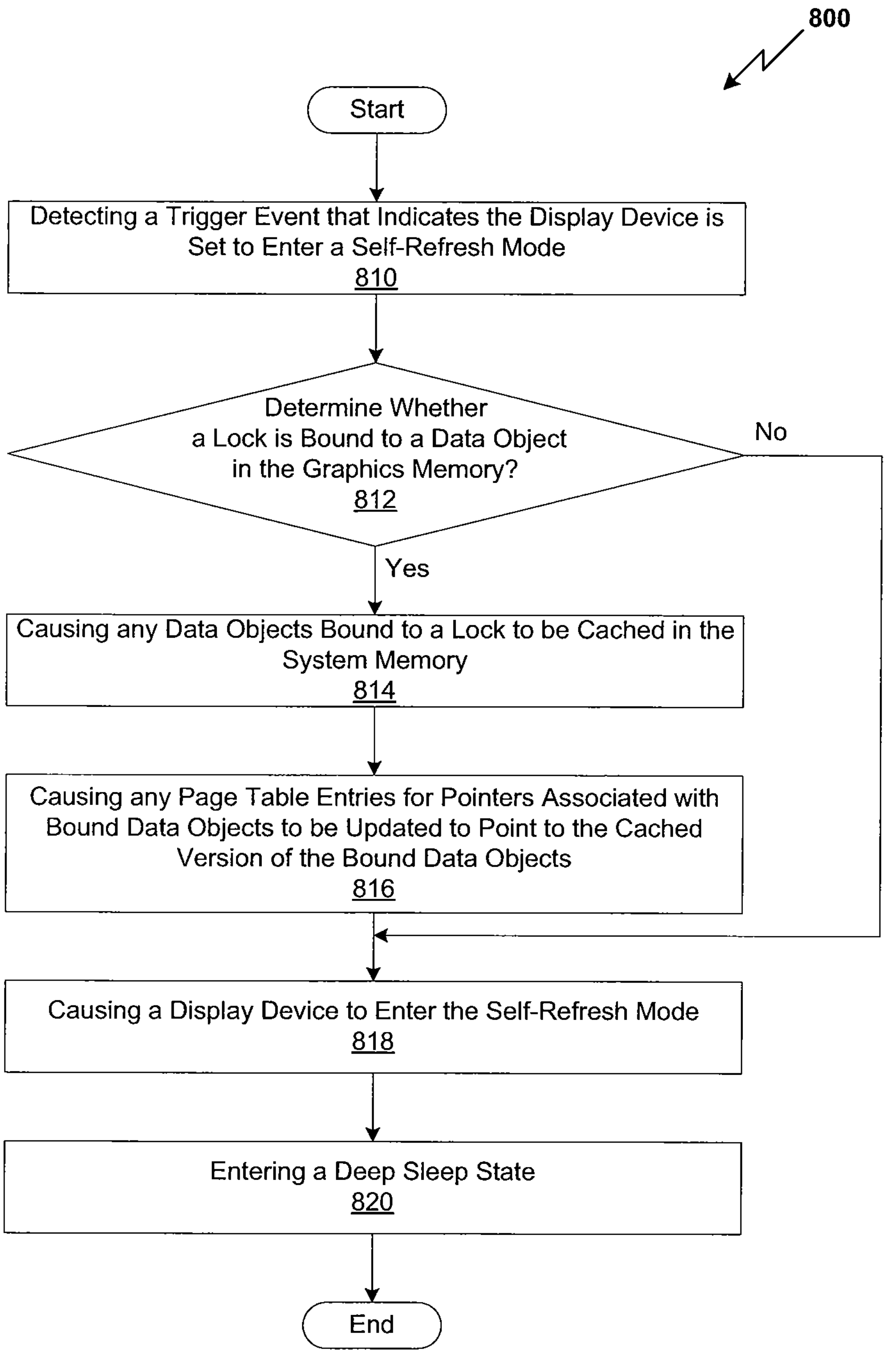
FIG. 8 sets forth a flowchart of a method for providing an application access to data objects associated with a graphics processing unit while the graphics processing unit is in a deep sleep state, according to one embodiment of the present invention.

FIG. 8 sets forth a flowchart of a method 800 for providing an application 614 access to data objects associated with a graphics processing unit 240 while the graphics processing unit 240 is in a deep sleep state, according to one embodiment of the present invention. Although the method steps are described in conjunction with the systems of FIGS. 1, 2A-2D, 3-6 and 7A-7B, persons skilled in the art will understand that any system configured to perform the method steps, in any order, is within the scope of the invention.

The method begins at step 810, where GPU 240 detects a trigger event that indicates that the display device is set to enter a self-refresh mode. In one embodiment, GPU 240 may monitor graphical activity in the pixel data stored in frame buffers 244. If the pixels remain static (i.e., do not change) for a threshold number of frames of digital video, then GPU 240 may detect a first level of idleness in the pixel data. In response to detecting the first level of idleness, the display device 110 may ideally be placed in a self-refresh mode and the GPU 240 and memory 242 may enter a deep sleep state in order to minimize total power consumption of computer system 100. At step 812, GPU 240 determines whether a mutual exclusion mechanism (i.e., a lock bit in locks 624) is bound to a data object in memory 242. For example, GPU 240 determines whether operating system 612 or application 614 has acquired a lock on any data objects. If a mutual exclusion mechanism is bound to a data object, then method 800 proceeds to step 814 where GPU 240 causes the data objects bound to a mutual exclusion mechanism to be cached in system memory 104. At step 816, GPU 240 causes a page table entry in page tables 616 to be updated so that a pointer associated with the data object points to a virtual memory address in virtual memory address space 710 that corresponds to a memory address associated with the cached version of the data object. Then, method 800 proceeds to step 818.

Returning now to step 812, if no mutual exclusion mechanism is bound to a data object, then method 800 proceeds directly to step 818. At step 818, GPU 240 causes display device 110 to enter a panel self-refresh mode. In one embodiment, GPU 240 transmits a panel self-refresh entry request to display device 110 via communications path 280. Once display device has entered the panel self-refresh mode successfully, method 800 proceeds to step 820 where GPU 240 enters a deep sleep state. In one embodiment, GPU 240 enters GPU power off state 550 where the power supply for GPU 240 as well as memory 242 may be switched off. Once GPU 240 is in the deep sleep state, method 800 terminates.

In sum, the disclosed technique provides access to data objects associated with a graphics controller to one or more applications executing on the host computer system even when the graphics controller is in a deep sleep state. The graphics controller allocates memory for a data object in a memory associated with the graphics controller. A pointer to the object is passed to the host computer system, which is remapped by the host computer system into a virtual memory address space. Before a graphics controller enters a deep sleep state, the graphics controller causes a copy of the data object to be cached in system memory, and a page table entry is updated to map the virtual memory address in the pointer to an address of the cached data object in the system memory. When the graphics controller enters the deep sleep state, applications may continue to access the data objects using the virtual memory address included in the pointer.

One advantage of the disclosed technique is that the physical storage locations of the data objects are transparent to an operating system or applications executing on the host computer system. A pointer that identifies the physical storage location is the same for the applications whether the data object resides in the graphics memory or the system memory. Furthermore, the state of the data object may be tracked while the graphics controller is switched off to determine whether the graphics controller needs to update the data object in the graphics memory once the graphics controller is woken up and resumes processing graphics data to generate video signals for display on the display device. Consequently, the transition into and out of a self-refresh mode is transparent to an operating system and application that are configured to access the data objects.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for controlling a graphics processing unit coupled to a self-refreshing display device, the method comprising:

detecting a trigger event that indicates that the display device is set to enter a self-refresh mode;

in response to detecting the trigger event, determining whether any mutual exclusion mechanism in a set of mutual exclusion mechanisms is bound to a data object stored in a memory associated with the graphics processing unit, wherein the mutual exclusion mechanism prevents the data object from being accessed by two or more processes simultaneously; and if at least one mutual exclusion mechanism is bound to a data object, for each mutual exclusion mechanism bound to a data object, copying the data object and entering a deep sleep state, or if no mutual exclusion mechanisms are bound to a data object, then entering the deep sleep state without copying the data object.

2. The method of claim 1, further comprising:

waiting until no mutual exclusion mechanisms are bound to any data object; and once no mutual exclusion mechanisms are bound to any data object, then entering the deep sleep state.

3. The method of claim 1, wherein the step of copying comprises:

causing a copy of the data object bound to the mutual exclusion mechanism to be cached in a system memory; and causing a pointer to the data object bound to the mutual exclusion mechanism to be updated to point to a location in the system memory associated with the copy.

4. The method of claim 3, further comprising:

causing a copy of each of one or more data objects having a high probability of being bound to a mutual exclusion mechanism while in the deep sleep state to be cached in the system memory; and causing one or more pointers corresponding to the one or more data objects having a high probability of being bound to be updated to point to a location in the system memory associated with the corresponding copy of the data object in system memory.

5. The method of claim 1, wherein the step of copying comprises:

causing a copy of the data object bound to the mutual exclusion mechanism to be cached in a system memory; and causing a pointer associated with the data object bound to the mutual exclusion mechanism to point to a null pointer object, wherein an attempt by an application to access the data object associated with the pointer generates a page fault.

6. The method of claim 5, the method further comprising:

exiting the deep sleep state in response to a first page fault being generated;

updating the pointer associated with the data object associated with the first page fault to point to a location in the system memory corresponding to a copy of the data object associated with the first page fault; and re-entering the deep sleep state.

7. The method of claim 5, the method further comprising:

exiting the deep sleep state in response to a first page fault being generated; and updating the pointer associated with the data object associated with the first page fault to point to a location in the memory associated with the graphics processing unit corresponding to the data object associated with the first page fault.

8. The method of claim 1, further comprising:

determining whether any of the data objects bound to a mutual exclusion mechanism is accessed at an average rate that is greater than a first threshold; and if any of the data objects bound to a mutual exclusion mechanism is accessed at an average rate greater than the first threshold, then delaying transition to the deep sleep state, or if none of the data objects bound to a mutual exclusion mechanism is accessed at an average rate greater than the first threshold, then entering the deep sleep state.

9. A sub-system comprising:

a graphics processing unit configured to:

detect a trigger event that indicates that the display device is set to enter a self-refresh mode, in response to detecting the trigger event, determine whether any mutual exclusion mechanism in a set of mutual exclusion mechanisms is bound to a data object stored in a memory associated with the graphics processing unit, wherein the mutual exclusion mechanism prevents the data object from being accessed by two or more processes simultaneously; and if at least one mutual exclusion mechanism is bound to a data object, for each mutual exclusion mechanism bound to a data object, copy the data object and enter a deep sleep state, or if no mutual exclusion mechanisms are bound to a data object, then enter the deep sleep state without copying the data object.

10. The sub-system of claim 9, the graphics processing unit further configured to:

wait until no mutual exclusion mechanisms are bound to any data object; and once no mutual exclusion mechanisms are bound to any data object, then enter the deep sleep state.

11. The sub-system of claim 9, the graphics processing unit further configured to:

causing a copy of the data object bound to the mutual exclusion mechanism to be cached in a system memory; and causing a pointer to the data object bound to the mutual exclusion mechanism to be updated to point to a location in the system memory associated with the copy.

12. The sub-system of claim 11, the graphics processing unit further configured to:

cause a copy of each of one or more data objects having a high probability of being bound to a mutual exclusion mechanism while in the deep sleep state to be cached in the system memory; and cause one or more pointers corresponding to the one or more data objects having a high probability of being bound to be updated to point to a location in the system memory associated with the corresponding copy of the data object in system memory.

13. The sub-system of claim 9, the graphics processing unit further configured to:

cause a copy of the data object bound to the mutual exclusion mechanism to be cached in a system memory; and cause a pointer associated with the data object bound to the mutual exclusion mechanism to point to a null pointer object, wherein an attempt by an application to access the data object associated with the pointer generates a page fault.

14. The sub-system of claim 13, the graphics processing unit further configured to:

exit the deep sleep state in response to a first page fault being generated;

update the pointer associated with the data object associated with the first page fault to point to a location in the system memory corresponding to a copy of the data object associated with the first page fault; and re-enter the deep sleep state.

15. The sub-system of claim 13, the graphics processing unit further configured to:

exit the deep sleep state in response to a first page fault being generated; and update the pointer associated with the data object associated with the first page fault to point to a location in the memory associated with the graphics processing unit corresponding to the data object associated with the first page fault.

16. The sub-system of claim 9, the graphics processing unit further configured to:

determine whether any of the data objects bound to a mutual exclusion mechanism is accessed at an average rate that is greater than a first threshold; and if any of the data objects bound to a mutual exclusion mechanism is accessed at an average rate greater than the first threshold, then delay transition to the deep sleep state, or if none of the data objects bound to a mutual exclusion mechanism is accessed at an average rate greater than the first threshold, then enter the deep sleep state.

17. A computing device comprising:

a sub-system that includes a graphics processing unit configured to:

detect a trigger event that indicates that the display device is set to enter a self-refresh mode, in response to detecting the trigger event, determine whether any mutual exclusion mechanism in a set of mutual exclusion mechanisms is bound to a data object stored in a memory associated with the graphics processing unit, wherein the mutual exclusion mechanism prevents the data object from being accessed by two or more processes simultaneously; and if at least one mutual exclusion mechanism is bound to a data object, for each mutual exclusion mechanism bound to a data object, copy the data object and enter a deep sleep state, or if no mutual exclusion mechanisms are bound to a data object, then enter the deep sleep state without copying the data object.

18. The computing device of claim 17, the graphics processing unit further configured to:

cause a copy of the data object bound to the mutual exclusion mechanism to be cached in a system memory; and cause a pointer to the data object bound to the mutual exclusion mechanism to be updated to point to a location in the system memory associated with the copy.

19. The computing device of claim 17, the graphics processing unit further configured to:

cause a copy of the data object bound to the mutual exclusion mechanism to be cached in a system memory, and cause a pointer associated with the data object bound to the mutual exclusion mechanism to point to a null pointer object, wherein an attempt by an application to access the data object associated with the pointer generates a page fault.

20. The computing device of claim 19, the graphics processing unit further configured to:

exit the deep sleep state in response to a first page fault being generated;

update the pointer associated with the data object associated with the first page fault to point to a location in the system memory corresponding to a copy of the data object associated with the first page fault; and re-enter the deep sleep state.

* * * * *